Sept. 25, 1962 P. MARTINEZ 3,055,974
TELEVISION APPARATUS
Filed March 4, 1959
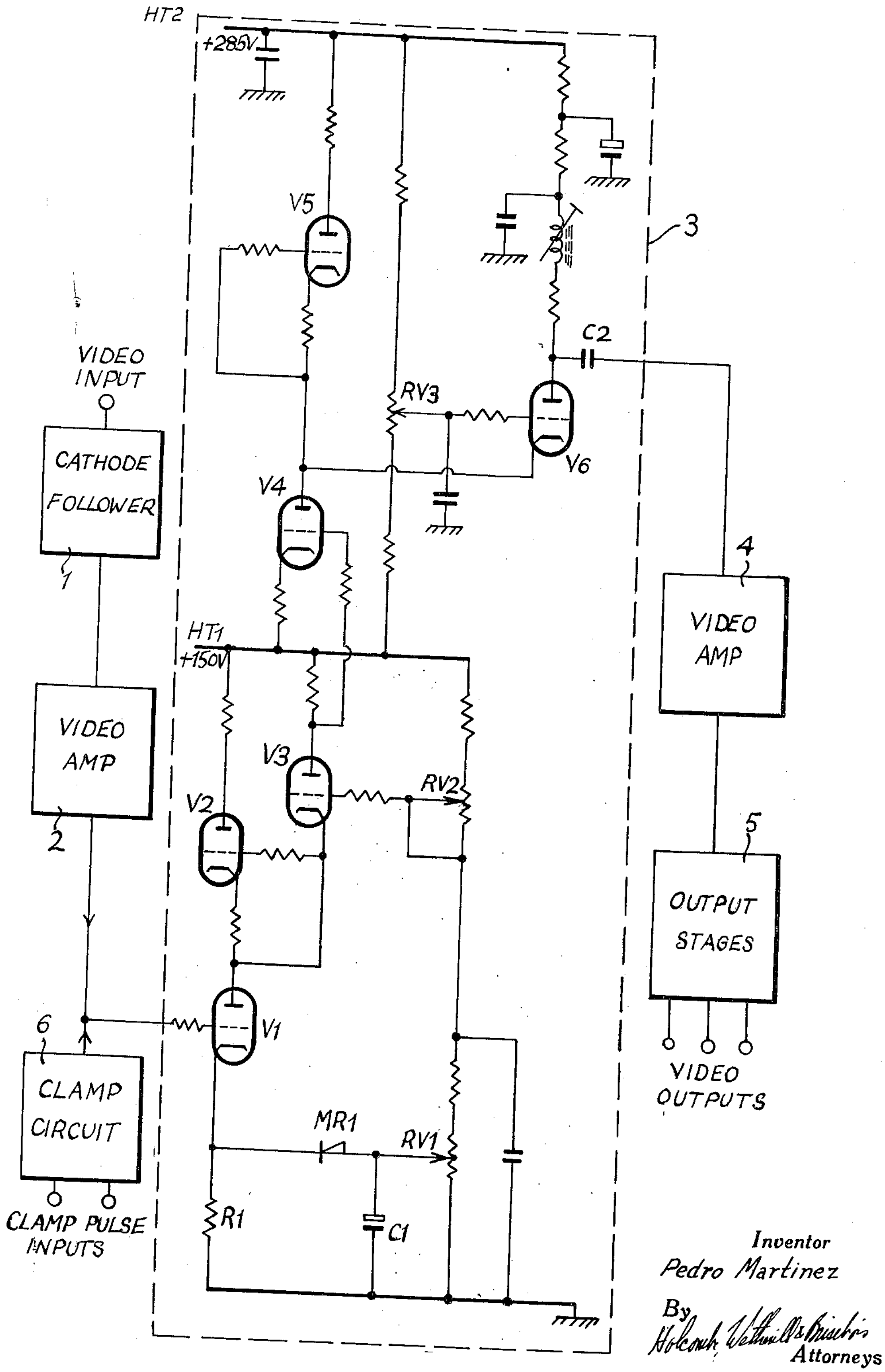
Inventor
Pedro Martinez
By
Attorneys 3,055,974

TELEVISION APPARATUS

Pedro Martinez, Walton-on-Thames, England, assignor to Pye Limited, Cambridge, England, a British company Filed Mar. 4, 1959, Ser. No. 797,255
Claims priority, application Great Britain Mar. 10, 1958
9 Claims. (Cl. 178—7.1)

The present invention relates to television apparatus particularly for use in the generation and transmission of television signals.

It is sometimes desired to feed a television transmitter with a complete television waveform comprising video signals and synchronising signals originating from a remote point. In such a case, during its passage to the television transmitter the remote complete television waveform often becomes distorted and arrives at the transmitter suffering particularly from low frequency distortion and hum. It is therefore usual to employ circuits to remove the hum and to restore the low frequencies in the signal before it is fed to modulate the transmitter.

It is an object of the present invention to provide improvements in such circuits whereby a substantially distortion-free and hum-free complete television waveform is available for modulating the transmitter and also to provide a waveform wherein the synchronising pulses are of substantially constant amplitude and of the desired amplitude.

According to the present invention a complete television waveform is clamped during black level periods to restore the D.C. component of the signal and is then fed to an amplifier stage which is arranged so that its gain increases over the synchronising pulse portion of the waveform relative to its gain over the video portion of the waveform, whereby the synchronising pulses are amplified to a greater extent than the video portion of the waveform, the output of said amplifier stage being fed to a clipping stage which clips the synchronising pulses at a desired level and which is arranged in parallel with the output load of said amplifier stage whereby, when the clipping stage is cut-off, the output load impedance of the amplifier stage increases to improve the clipping action.

According to a feature of the invention, the amplifier stage comprises a valve having a cathode bias circuit including a rectifying device which is biassed so that it becomes conducting upon the synchronising pulse potential being applied to the control grid of the valve in order to connect a decoupling condenser across the cathode bias resistor of the valve and therefore increase its gain during synchronising pulse periods.

According to a further feature of the invention, the amplifier stage consists of a first valve having an anode load comprising a second amplifier valve connected in series with the anode of the first amplifier valve and in parallel with the clipping stage. The clipping stage may comprise a grounded grid amplifier having the output of the first amplifier stage fed to its cathode.

In order to achieve peak white limiting, the output signal from the clipping stage may be fed to the input of a further amplifier having a load circuit similar to that employed for clipping synchronising pulses, for example consisting of a valve in series with the amplifier and forming its output load, and a grounded grid clipping stage in parallel with the series valve, the further clipping stage serving to limit the peak white amplitude of the video portion of the waveform.

In order that the invention may be more fully understood, reference will now be made to the accompanying drawing which shows a block circuit diagram of a stabilising amplifier for stabilising and removing distortion from television signals arriving at a transmitter from a remote point, in which the part of the amplifier circuit forming the subject of the present invention is shown in detail.

Referring to the drawing, an incoming complete television waveform comprising video and synchronising signals, for example from a remote point, and which may contain low frequency distortion and hum, is fed through a cathode follower 1 and a video amplifier 2 to the clipping and limiting circuit enclosed within the rectangle 3 and constructed according to this invention. The output from the clipping and limiting circuit is fed through a video amplifier 4 to an output stage 5 providing a plurality of outputs for the complete television waveform.

The clipping and limiting circuit will now be described in detail. The output from video amplifier 2 is fed to the grid of a triode amplifying valve V1 where it is clamped by means of the clamp circuit 6 during "back-porch" black level periods of the inter-line blanking period to restore the D.C. component and restore the grid of valve V1 to a fixed potential independent of the video component of the applied waveform. The clamp circuit 6 may conveniently comprise a bridge clamping arrangement consisting of four diodes, and is fed with clamping pulses which may be derived from the synchronising pulses of the incoming television waveform by feeding this waveform through a synchronising separator stage and suitable pulse shaping and phase splitting circuits to produce the clamping pulses. The valve V1 has a cathode bias circuit consisting of a resistor R1 across which is connected a condenser C1 in series with a rectifier MR1. The rectifier is biassed by means of a potential derived through variable resistor RV1, forming part of a potentiometer chain connected across the stabilised high tension supply HT1, so that the rectifier is normally cut-off. The complete television waveform is applied to the grid of V1 in a positive sense, that is with the synchronising pulses negative-going, and the potential on the rectifier MR1 is so adjusted that, as the commencement of the synchronising pulse excursion begins to carry the cathode of V1 negative, this rectifier conducts thereby connecting the decoupling condenser C1 across the resistor R1, so increasing the gain of valve V1. In this way the synchronising pulses are amplified at the anode of V1 to a greater extent than the video portion of the waveform and become independent of variations in the amplitude of the input synchronising pulses. The anode load of valve V1 is shown as consisting of a further triode valve V2 connected in series with valve V1 and this arrangement is preferred to a resistive load for valve V1 since it allows for heater voltage fluctuations. In parallel with triode V2 is arranged a further triode valve V3 arranged as a grounded grid amplifier having its cathode connected to the anode of V1 and its grid connected to a variable resistor RV2 forming part of the potentiometer chain across the high tension supply which includes RV1.

The grounded grid stage constituted by valve V3 operates to clip the tips of the synchronising pulses in the following manner. Normally valve V3 is conducting and valve V1 works into the low cathode impedance of valve V3; however on the positive excursion of the signal at the anode of V1, i.e. during the peaks of the synchronising pulses, valve V3 cuts-off and the anode load of valve V1 becomes the much higher load presented by valve V2. This action greatly increases the amplification of the valve V1 during the more positive portions of the synchronising pulses which helps the clipping action of valve V3. As the grid of valve V3 is earthed for A.C. signals and the capacitance between its anode and cathode is extremely small, there is very little chance of any signal breaking through this clipping stage when it is cut-off. The clipping level and hence the synchronising pulse amplitude is adjusted by varying the potential at the grid of valve V3 by means of RV2.

In order to limit the peak white amplitude of the video portion of the television waveform, which constitutes the negative-going portion of the output signal from valve V3, the output of this valve is fed to a further triode amplifier stage valve V4. The anode circuit of valve V4 is generally similar to the anode circuit of valve V1 and consists of a series anode load constituted by a triode valve V5, and a further grounded grid triode valve V6 connected in parallel with V5 and operating as the peak white limiter.

D.C. coupling is employed between the output of valve V3 and input of valve V4, which avoids the necessity of employing a separate clamping circuit at the grid of valve V4 since clamping circuit 6 is sufficient to restore the signal for both the black level clipping and peak white limiting actions. Normally grounded grid stage V6 is conducting and therefore amplifier V4 works into the low cathode impedance of valve V6. However on the more positive excursions of the signal at the anode of valve V4, that is during the peak white portions of the video waveform, valve V6 is cut-off and therefore the anode load of valve V4 becomes the much higher impedance constituted by valve V5. This increases the amplification of the signal helping the clipping action. The peak white limit level is adjusted by means of variable resistor RV3 forming part of a potentiometer chain connected across the stabilised high tension supply HT2.

The output of peak white limiter V6 is fed through a condenser C2 to the video amplifier V4, and thence to the output stage V5. This output stage may comprise a plurality of amplifiers fed in parallel, each of which produces an output signal in its anode which is fed to a separate ouput point.

The circuit according to this invention substantially removes undesirable low frequency distortion and hum from a complete television waveform and restores the low frequencies in the signal. Furthermore, noise present on the peaks of the synchronising pulses is removed and the output signal consists of constant amplitude synchronising pulses. Also, any excursion of the video signal beyond peak white amplitude is removed. In effect the synchronising pulses are shaped between two stable potentials, namely the anode/cathode potential at the junction of V1 and V3 and the control grid potential of V3.

Whilst a particular embodiment has been described it will be understood that various modifications may be made without departing from the scope of this invention. Thus although it is preferred to use series valves V2 and V5 as anode loads for amplifiers V1 and V4 respectively, in order to allow for heater voltage fluctuations, the anode loads of one or both of valves V1 or V4 may alternatively consist of resistors. With a resistive anode load however the clipping efficiency of the associated grounded grid valve, V3 or V6 respectively, might be reduced by heater voltage fluctuations causing a variation in the anode voltage of valve 1 or valve 4 while the respective clipping valves V3 and V6 are cut-off. Furthermore variable resistors RV1 and RV2 may be connected in independent paths to the HT1 positive supply, but such an arrangement necessitates resetting control RV1 after adjustment of the synchronising amplitude control RV2 since this latter control changes the anode voltage of valve V1. By including the two variable resistors in a single potentiometer chain as shown, this effect is balanced out and adjustment of the synchronising pulse amplitude control RV2 affects both the anode and cathode potentials of valve V1 and rectifier MR1.

The circuit arrangement according to this invention may also be employed for handling a television signal direct from a television camera, in which case the output signal from the camera is clamped to black level by the clamp circuit 6 and then fed to valve V1. Valve V3 now acts as a black level clipper and blanking pulses may be inserted in the television signal at the grid of this valve which is rendered non-conducting for the blanking periods. Variable resistor RV2 now serves as a "lift" control to set the black level. Vertical shade correction, if required, can be inserted in the clamp circuit, or an appropriate correction waveform can be applied to the grid of valve V2.

Instead of inserting the blanking pulses at the grid of valve V3, they may be inserted at the input to valve V1.

I claim:

1. A circuit arrangement for reducing distortion in a television waveform including video signals and synchronizing pulses comprising means for clamping the television waveform during black level periods to restore the D.C. component of the signal, an amplifier stage connected to said clamping means, circuit means included in said amplifier stage whereby its gain increases over the synchronising pulse portion of the waveform relative to its gain over the video portion of the waveform whereby the synchronising pulses are amplified to a greater extent than the video portion of the waveform, an output load for said amplifier stage, a clipping stage connected in parallel with said output load, means for D.C. biasing the clipping stage so that when it is cut off the output load impedance of the amplifier stage increases to improve the clipping action, means for varying the D.C. bias applied to the clipping stage to vary the clipping level and means for feeding the output of said amplifier stage through said clipping stage which clips the synchronising pulses at a desired level.

2. A circuit arrangement for reducing distortion in a television waveform including synchronising pulses comprising means for clamping the television waveform during black level periods to restore the D.C. component of the signal, an amplifier stage connected to said clamping means and comprising a first valve, an anode load for said first valve comprising a second amplifier valve connected in series with the anode of the first valve, circuit means included in said amplifier stage whereby its gain increases over the synchronising pulse portion of the waveform relative to its gain over the video portion of the waveform whereby the synchronising pulses are amplified to a greater extent than the video portion of the waveform, a clipping stage connected in parallel with said second valve constituting the anode load of said first valve, means for D.C. biasing the clipping stage so that when it is cut off the output load impedance of the amplifier stage increases to improve the clipping action and means for feeding the output of said amplifier stage to the input electrode of said clipping stage to clip the synchronising pulses at a desired level.

3. A circuit arrangement as claimed in claim 2, in which the clipping stage comprises a third valve acting as a grounded grid amplifier and means for feeding the output of the first amplifier valve to the cathode of said third valve.

4. A circuit arrangement as claimed in claim 2, including a further amplifier having load circuit means operative to limit the peak white amplitude of the video portion of the waveform, and a direct current connection for feeding an output from said clipping stage to said peak white limiting stage.

5. A circuit arrangement as claimed in claim 4, in which the further amplifier consists of a valve having another amplifier valve connected to its anode in parallel with the peak white limiter.

6. A television circuit arrangement for reducing distortion on a complete television waveform comprising video signals and synchronising signals, consisting of means for clamping the complete television waveform during black level periods to restore the D.C. component of the signal, a first amplifier stage, means for feeding the clamped television waveform to the first amplifier stage with the synchronising pulses negative-going, said first amplifier stage comprising a first amplifier valve having an anode, a cathode and a control grid and having a cathode load consisting of a resistor with a rectifier and condenser connected in series across said resistor, means of biasing said rectifier to conduct only when the cathode potential of said first amplifier valve drops below a certain value set by said biasing means whereby said amplifier valve increases its gain during synchronising pulse periods, an anode load for said first amplifier valve, said anode load comprising a further amplifier valve, a clipping stage connected in parallel with said further amplifier valve, said clipping stage comprising a grounded grid amplifier valve, a potentiometer for applying a variable D.C. bias potential to the grid of said grounded grid amplifier valve, said bias potential being set by said potentiometer so that said clipping stage clips the synchronising pulses at a desired level, whereby when the clipping stage is cut off the output load impedance of the amplifier stage increases to improve the clipping action.

7. A television circuit arrangement for reducing distortion on a complete television waveform comprising video signals and synchronising signals comprising a first amplifier valve having an anode, a cathode and a control grid and having a cathode load consisting of a resistor with a rectifier and condenser connected in series across said resistor, means for biasing said rectifier to conduct only when the cathode potential of said first amplifier valve drops below a certain value means for feeding the complete television waveform to said control grid, a second amplifier valve having an anode, a cathode and control grid connected in series with the anode of the first amplifier valve and constituting the anode load of said first amplifier valve, and a third amplifier valve having an anode, a cathode and a control grid connected in parallel with the second amplifier valve, said third amplifier valve being connected as a grounded grid amplifier and means for applying a variable D.C. bias potential to its control grid.

8. A circuit arrangement as claimed in claim 7, including a first resistor connecting the anode of the first amplifier valve to the cathode of the second amplifier valve, a second resistor connecting the grid of the second amplifier valve to the cathode of the third amplifier valve and a direct connection between said cathode of the third amplifier valve and the anode of the first amplifier valve.

9. A circuit arrangement as claimed in claim 7, including a fourth amplifier valve having an anode, a cathode and a control grid, a direct current connection between the anode of the third amplifier valve and the grid of the fourth amplifier valve, an anode circuit for said fourth amplifier valve consisting of a fifth amplifier valve having an anode, a cathode and a control grid, a resistor connected between the anode of said fifth amplifier valve and a high tension positive supply line, a further resistor connected between the cathode of said fifth amplifier valve and the anode of said fourth amplifier valve, another resistor connected between the control grid of said fifth amplifier valve and the anode of said fourth amplifier valve, a sixth amplifier valve having an anode, a cathode and a control grid arranged in parallel with said fifth amplifier valve and operating as a grounded grid amplifier, an anode load for said sixth amplifier valve, a direct current connection between the cathode of said sixth amplifier valve and the anode of said fourth amplifier valve, and means for applying a variable D.C. bias potential to the control grid of said sixth amplifier valve.

References Cited in the file of this patent

UNITED STATES PATENTS

| | | |
|---|---|---|
| 2,445,040 | Schade | July 13, 1948 |
| 2,583,345 | Schade | Jan. 22, 1952 |
| 2,717,931 | Duke | Sept. 13, 1955 |
| 2,724,738 | Babbs | Nov. 22, 1955 |
| 2,760,008 | Schade | Aug. 21, 1956 |